July 30, 1963  H. M. BENNETT  3,099,301
METHOD OF PEG BUNDLING AND STRAIGHTENING LUMBER
Filed Aug. 29, 1958  3 Sheets-Sheet 1
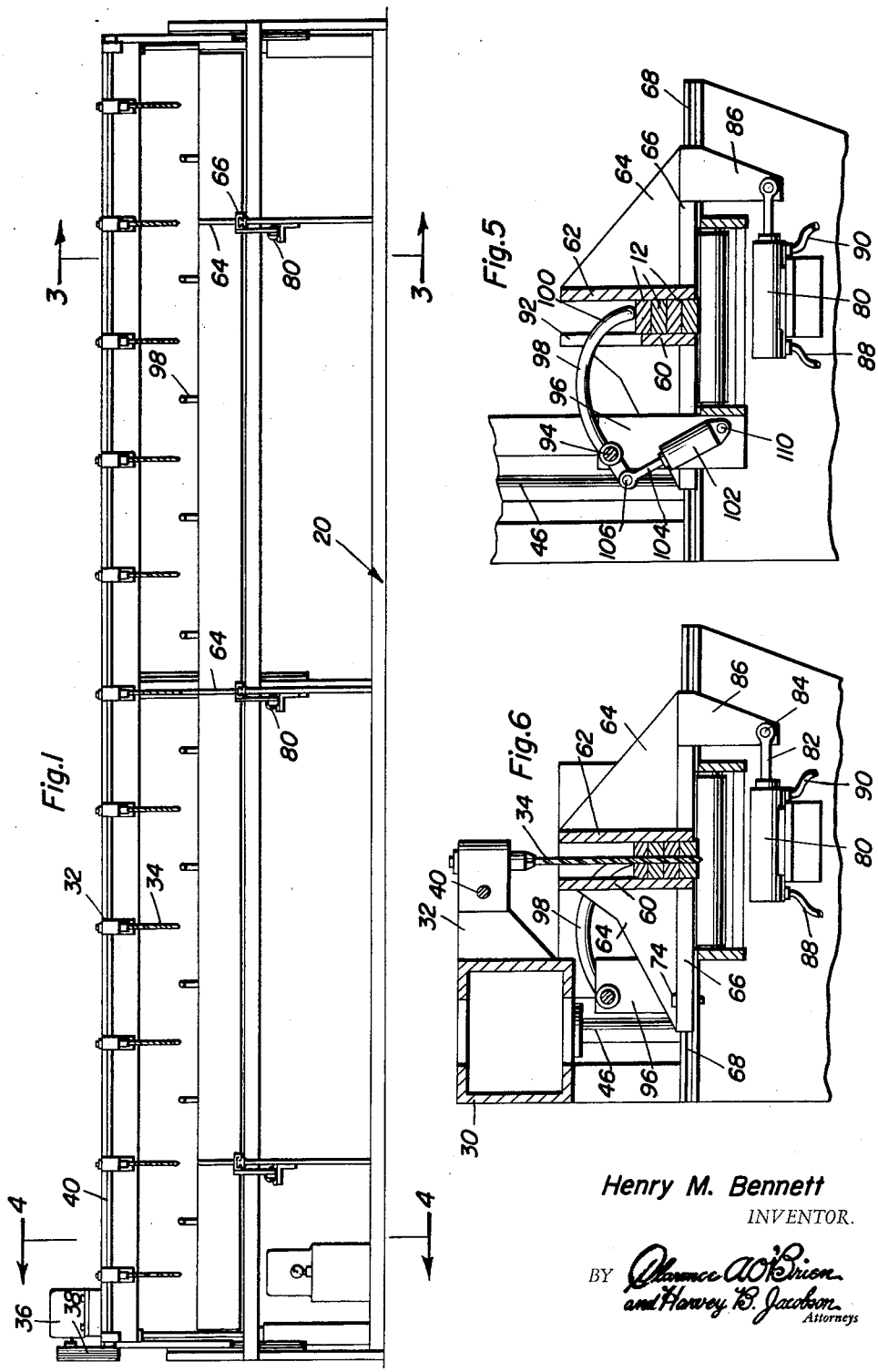
Henry M. Bennett
INVENTOR.

July 30, 1963    H. M. BENNETT    3,099,301
METHOD OF PEG BUNDLING AND STRAIGHTENING LUMBER
Filed Aug. 29, 1958    3 Sheets-Sheet 2
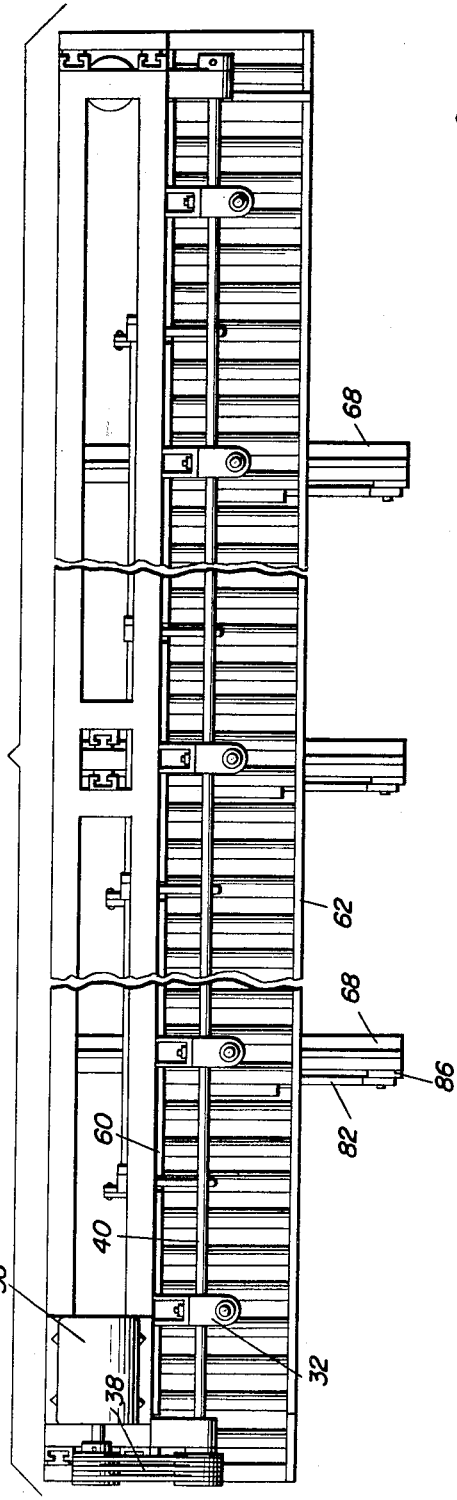
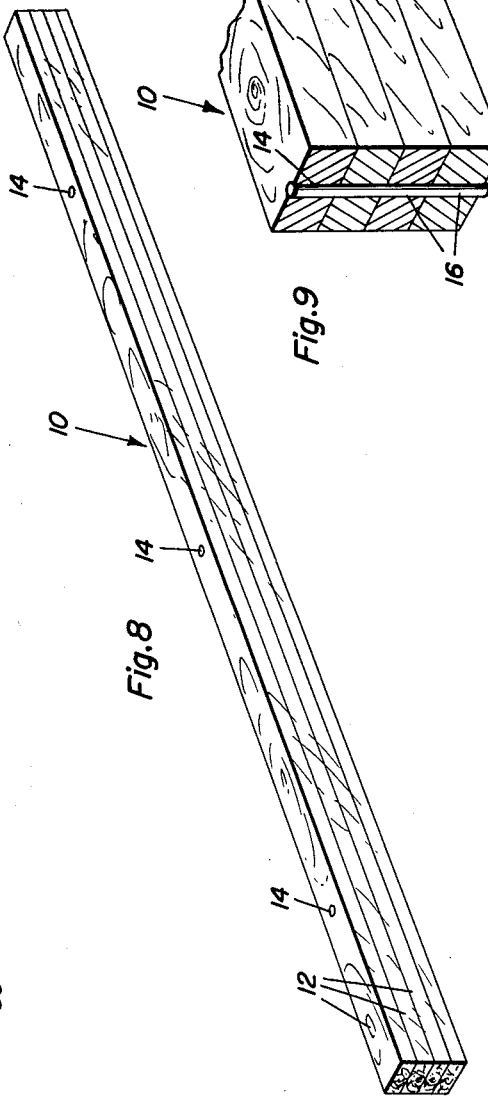
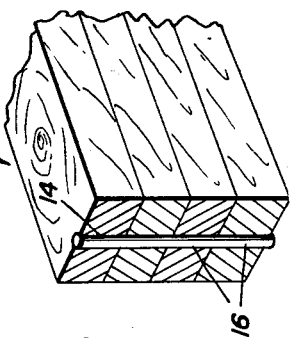
Henry M. Bennett
INVENTOR.
BY
Attorneys July 30, 1963    H. M. BENNETT    3,099,301
METHOD OF PEG BUNDLING AND STRAIGHTENING LUMBER
Filed Aug. 29, 1958      3 Sheets-Sheet 3
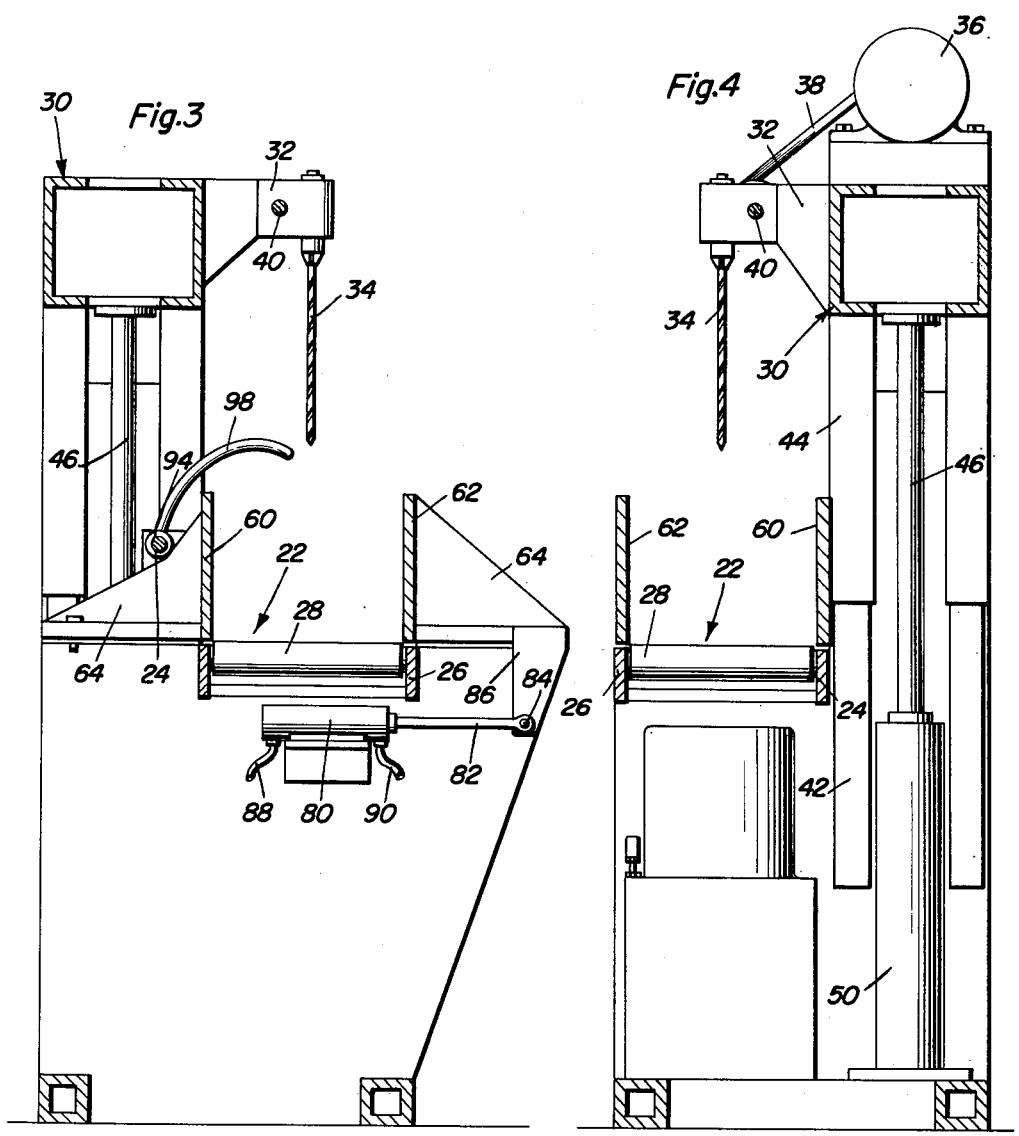
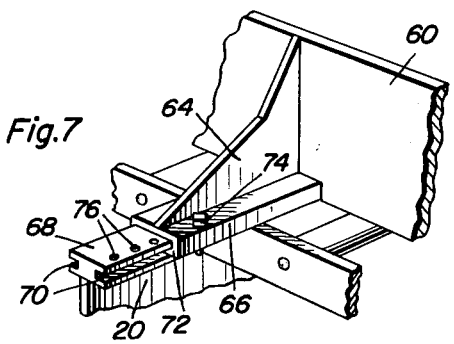
Henry M. Bennett
INVENTOR.

United States Patent Office 3,099,301
Patented July 30, 1963

3,099,301
METHOD OF PEG BUNDLING AND STRAIGHTENING LUMBER
Henry M. Bennett, P.O. Box 107, De Ridder, La.
Filed Aug. 29, 1958, Ser. No. 758,046
1 Claim. (Cl. 144—321)

This invention comprises a novel and useful means for peg bundling and straightening lumber and more particularly relates to an apparatus for securing a plurality of pieces of lumber in a single bundle while the lumber is held in a straightened condition, by applying dowel pins through bores drilled in the straightened and compressed lumber, and a lumber package formed thereby.

Certain of the cheaper grades of lumber, especially newly sawn green lumber such as white pine and the like have a tendency to become bowed or otherwise distorted. This produces a problem in the shipping of such lumber and in its storage owing to the lack of uniformity in the shape of the lumber, which condition tends to become worse as the lumber dries.

The basic concept of the present invention resides in the forcing of such crooked lumber into a straight condition by suitable means, and then retaining the lumber in such condition by bundling a plurality of pieces together and securing them in this condition by the insertion of dowel pins through holes bored through the stack of lumber at intervals along the length of the same. By this means the crooked pieces are held in a straight condition, the plurality of pieces are secured together to form an easily handled package or bundle, and the pieces are compelled to remain in a straight condition during the drying of the same. The boring of holes and the insertion of dowel pegs in the pieces of lumber in such a stack or bundle is in no way objectionable for many uses of lumber of this character, and the act of straightening the lumber and reducing the deformation in the same during the drying operation as well as the convenience and compactness of handling a plurality of pieces of lumber in a single bundle greatly increase the practical value of lumber of this character.

It is therefore the primary purpose of this invention to provide a means whereby boards may be straightened and secured and retained in their straightened condition in bundles or packages.

A further object of the invention is to provide a means in accordance with the preceding object wherein dowel pins may be inserted through the boards forming a single package at longitudinally spaced intervals therealong to retain the boards in their assembled condition and also retain the crooked boards in a straightened position.

A further and more specific object of the invention is to provide means which may be readily attached to conventional types of gang boring or drilling machines which will specifically adapt the latter for forming pegged bundles of lumber as aforesaid, and whereby the capacity of the machine to handle different sizes or widths of lumber may be easily and readily adjusted while still retaining the centered position of the bore holes and dowel pegs through the lumber.

Another specific object of the invention is to provide an attachment in accordance with the preceding object wherein power operated means are provided for compressing a pile of lumber into a flat bundle while the dowel holes are drilled therethrough and dowel pegs are inserted therein, and whereby the pressure applying means shall not interfere with or be hindered by the means which clamp the sides of the boards to form a compact bundle thereof.

A still further specific object of the invention is to provide an attachment as set forth in the foregoing objects wherein readily adjustable side clamping means which are power operated shall be provided for clamping the series of boards in vertical alinement with each other to enable the aforesaid operations of boring and pegging to be performed, and whereby the stack of boards so clamped together will be positioned and centered with respect to the boring drills of the apparatus.

A still further important object of the invention is to provide an improved bundle or package of boards whereby the latter will be held tightly into a compact arrangement and whereby the boards will be retained in a straightened condition while they are in the package.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of an apparatus consisting primarily of a power operated gang boring machine to which the principles of this invention have been applied for adapting the apparatus for the peg bundling of boards;

FIGURE 2 is a top plan view of the apparatus of FIGURE 1, parts being broken away, and showing in particular the roller bed upon which the boards are moved through the apparatus together with the pressure means and the clamping means forming the attachment of this invention;

FIGURE 3 is a vertical transverse sectional view taken upon an enlarged scale substantially upon the plane indicated by the section line 3—3 of FIGURE 1 and showing especially the position of the board pressure applying means and the board clamping means in the idle position of the same;

FIGURE 4 is a vertical transverse sectional view taken upon an enlarged scale substantially upon the plane indicated by the section line 4—4 of FIGURE 1 and showing in particular the means for raising and lowering the head of the gang borer, the latter being shown in its raised position in readiness for the reception of a bundle of boards therebeneath;

FIGURE 5 is a fragmentary detail view taken in vertical transverse section and showing the manner in which the power operated clamping means functions to clamp a pile of boards in readiness for the boring and pegging operation;

FIGURE 6 is a view similar to FIGURE 5 but showing the manner in which the power operated clamping means vertically alines the boards in a stack and holds them together with the power means in tightly pressed position during the boring operation thereon;

FIGURE 7 is a detail view in perspective of one of the mounting means for the adjustable clamping back plate of the bundle clamping means of the invention;

FIGURE 8 is a perspective view of a pegged bundle of boards after the same has been packaged by this machine; and FIGURE 9 is a perspective view upon a somewhat enlarged scale of the bundle of FIGURE 8 with parts being shown in section and showing the position of the peg or dowel pin therein.

Referring first to FIGURES 8 and 9 it will be observed that the numeral 10 designates generally the package or bundle of a plurality of boards 12 which as shown are of the same width and length, and which are secured in a tightly engaged side-by-side flat relation in a vertically stacked manner and are fixedly secured relative to each other by a plurality of dowel pegs or dowel pins 14 which are pressed or otherwise fitted into alined vertical bores 16 at appropriate longitudinally spaced intervals through the stack of boards. Obviously, when the boards are secured together in this manner they may be handled effectively and stored as a single package thus reducing the labor required to handle the same. In addition, by virtue of the appropriately spaced dowel pins extending through the entire stack of boards in a package, the boards are retained in a flat straight position thereby preventing any further tendency of the boards to bend or warp, and to some extent at least correcting any previous tendencies of this character.

It will be readily understood that when it is desired to use the boards, the dowel peg 14 may be readily removed thus separating the boards. Lumber of this character, bored in this manner, is quite satisfactory for many rough building purposes as for the making of scaffolds, forms or the like, so that the presence of the bore holes therein is of negligible effect, which is more than counterbalanced by the quality of straightness and flatness which have been imparted to the boards.

In the accompanying drawings there is disclosed an apparatus specifically adapted for straightening and compressing the boards in a stack and for drilling the bore holes to facilitate the aplying of dowel pegs therein. This apparatus consists of a suitable supporting frame which is designated generally by the numeral 20 and is of the requisite length to accommodate any desired length of board which it is desired to package or bundle. Suitably mounted upon the support frame is a work bed or table for supporting the lumber to be bundled. As shown best in FIGURES 3 and 4, this bed, designated generally by the numeral 22, consists of a pair of side frame members 24 and 26 between which are journaled a plurality of parallel appropriately spaced rollers 28 which thus constitute a rolling surface for supporting the lumber to be bundled and to facilitate travel of the lumber and of the bundle longitudinally of the machine.

If desired, one or more of these rollers may have any suitable source of power aplied thereto, not shown, whereby to still further facilitate the handling and transporting of the boards thereon.

There is also provided a carriage 30 which extends longitudinally substantially the length of the apparatus and particularly of the bed 22 thereof and slightly to one side of the bed and positioned vertically thereabove. Projecting laterally from the carriage 30 which is preferably a hollow casing member, are a plurality of support arms 32, in each of which is journaled a drill bit 34 depending vertically therefrom and centered above the sides of the bed 22. As shown in FIGURE 1, in conjunction with FIGURE 2, there is provided an electric motor or the like as at 36 comprising any convenient and suitable source of power, which by means of a belt drive or the like as at 38 imparts rotation to a drive shaft 40 which extends through and is journaled in each of the arms 32 and is operatively connected to the drills 34 by any suitable driving means, not shown. It will be understood that any suitable longitudinal spacing of the arms 32 and the drill bits 34 carried thereby may be provided, depending upon the distance between the holes or bores which are to be formed in the stack of lumber which will become a bundle or package 10. Conveniently, a two foot spacing is usually satisfactory for this purpose.

As will be best apparent from FIGURE 4, a power operated means is provided for vertically adjusting the position of the carriage 30 and of the drill spindles or bits 34 carried thereby. For this purpose there are provided suitable guideways 42 forming the supporting frame upon which are slidably mounted slides 44 secured to and depending from the carriage 30 so that the carriage is thus mounted and guided for vertical travel. A fluid pressure actuating means such as a conventional form of hydraulic cylinder 50 is suitably anchored to and supported by the supporting framework, and has its fluid actuated piston, not shown, provided with a piston rod 46 which in turn is connected to the underside of the carriage 30. It will thus be apparent that upon proper actuation of the cylinder 50 the carriage will be vertically adjusted with respect to the bed to thus raise the drill bits and lower the same during the operation of the machine. Although any suitable fluid pressure means can be provided for actuating the cylinder 50, it is preferred to employ a hydraulic fluid for this purpose.

The apparatus also includes a means for clamping and properly stacking a series of boards in vertical position and in vertically spaced relation beneath the drill bits to perform the boring operation and the subsequent pegging operation. For this purpose there is provided a pair of side walls 60 and 62, these side walls being parallel to each other and positioned slightly above and adjustable to the side of the roller bed rails 24 and 26. The side rail 60 constitutes a relatively fixed rail, while the side rail 62 is relatively adjustable. Each of the side rails is provided with a laterally extending web 64 and with a flat laterally extending base 66 which constitutes a shoe or slide by which the rail is supported.

Referring especially to FIGURE 7 it will be seen that the supporting frame 20 includes a flanged guideway 68 which may be in the form of a flat plate having grooves in its opposite sides, the grooves being shown as at 70. The base 26 comprises a slide or shoe having lower inturned flanges 72 received in the grooves 70 so that the plate and consequently the entire side rail is secured to the guideway 68 and retained thereon for sliding movement transversely of the bed 22. Suitable fastening means such as the bolts 74 extend through the base 66 into selected longitudinally spaced apertures 76 on the guideway 68 to thereby lock and detachably secure the relatively fixed side rail 60 in its laterally adjusted position.

The relatively movable side rail 62 may be of similar construction and may have the same guide means for securing the same upon the supporting guideway 68. However, in place of the adjusting means 74 for locking the same in adjusted position, there is provided a power operated means for effecting adjustment of the relatively movable side rail. For this purpose there is provided an actuating means such as a fluid pressure actuated cylinder and piston unit indicated generally by the numeral 80 and having a piston rod 82 therefor, which is pivotally connected as at 84 to a depending bracket 86 on the outward edge of the web 64. The cylinder 60 is preferably secured below the bed 22 and is operated by a fluid pressure such as air from any suitable source, not shown, the air being selectively supplied to opposite ends of the cylinder as by conduits 88 and 90. The arrangement is such that the cylinder may be actuated to positively move the movable rail 62 towards or from the fixed rail 60. By proper adjustment of the fixed rail 60 and by manipulation of the movable rail 62 by the fluid pressure actuating means, the space between the two rails may be properly centered with respect to the drill bits 34, whereby boards of any desired width may be placed upon the bed and may be then clamped at their edges in fixed relation to provide a vertically alined stack of boards which is centered beneath the drill bits.

The relatively fixed rail 60, as shown best in FIGURE 5, is provided with a series of vertical slots or notches 92, appropriately spaced to permit actuation of a pressure applying means to be now described.

Pivoted as at 94 to a suitable support 96 forming a part of the supporting frame 20 of the machine are a series of arcuate rockers or lever arms 98, having their outer end portions 100 slidable through the slots 92 between the side rails 60 and 62 of the clamping means so that they may be engaged upon the stack of boards placed between the side rails as shown in FIGURE 5 and as indicated in FIGURE 6. Pressure is applied to these arms by means of the fluid pressure cylinder and piston unit 102, the piston rod of which 104 is pivoted to the arm 98 as at 106, while the other end of the unit is secured as by a pivot 110 to the member 96 previously mentioned. The arrangement is such that when the units 102 are actuated, the arms 100 thereof will press downwardly upon the boards 12 comprising the stack held in the clamping means and thus serve to flatten out or depress any bowed boards to cause the boards to be straightened and disposed in a flat face-to-face planar relation.

Any desired number of the pressure arms 98 may be provided, it being understood that each arm will be disposed between a pair of adjacent drill bits.

The operation is as follows:

With the carriage raised as shown in FIGURES 3 and 4, a series of boards of the desired width and length are moved along the conveyor bed 22 and are vertically stacked, the fixed side rail 60 having been laterally adjusted in accordance with the size of the board to be pegged. When the series of boards are stacked, the actuating means 80 is energized to cause the movable side rail 62 to approach the fixed rail 60 and thus clamp the two sides of the stack of boards, this being the position shown in FIGURES 5 and 6. Thereupon the pressure applying means is energized through the fluid pressure unit 102 causing the arms 98 to move downwardly through the slots 92 and engage the upper surface of the uppermost board at longitudinally spaced positions thereon and applying pressure through this board to the complete stack of boards, compress the boards together, flatten and straighten the boards and hold them securely. Thereafter, the cylinder 50 is energized causing the carriage 30 to be lowered and the drills 34 to thus simultaneously drill the desired vertical bores through the stack of boards as indicated in FIGURE 6. Thereupon the carriage is raised, and manually or in any other desired manner the dowel pegs 14 are then forced into the alined bores of the stack of boards to a position where they are substantially flush with the top and bottom surfaces of the stack. Thereafter, the pressure means and then the clamping means are released and the pegged bundle is withdrawn from the roller bed at the far end of the same for any suitable disposition.

What is claimed as new is as follows:

A method of packaging low grade boards for shipment or storage, some of the boards being transversely and/or longitudinally bowed and/or warped, comprising the following steps; positioning said boards in a stack on top of each other with said bowed or warped boards stacked in such a manner that vertically compressing said stack will straighten said bowed or warped boards, vertically aligning said boards, applying pressure to urge the top and bottom boards of said stack toward each other thereby compressing and straightening the warped boards in said stack, forming a plurality of longitudinally spaced bores through the boards of said stack extending from the upper surface to the lower surface thereof, inserting a dowel in each of at least two bores in frictional engagement with each of said boards and extending through each of said boards to retain the boards in substantially flat and straightened condition in a package, and storing said stack in a dry area for sufficient time to effect at least partial drying of said boards before removing individual ones of said boards from said stack.

References Cited in the file of this patent
UNITED STATES PATENTS

| | | |
|---|---|---|
| Re. 4,195 | Tomlinson | Dec. 6, 1870 |
| 23,031 | Kinsey | Feb. 22, 1859 |
| 1,600,720 | Denison | Sept. 21, 1926 |
| 2,234,789 | Wunderlich | Mar. 11, 1941 |
| 2,291,645 | Nordquist | Aug. 4, 1942 |
| 2,378,618 | Burt | June 19, 1945 |
| 2,517,939 | Stewart | Aug. 8, 1950 |
| 2,659,187 | Barnes | Nov. 17, 1953 |